United States Patent
Neumayer

(10) Patent No.: US 6,541,742 B2
(45) Date of Patent: Apr. 1, 2003

(54) COOKTOP WITH WEIGHING UNIT

(75) Inventor: Dan Neumayer, Bernau (DE)

(73) Assignee: BSH Bosch und Siemens Hausgeräte GmbH, Munich (DE)

( * ) Notice: Subject to any disclaimer, the term of this patent is extended or adjusted under 35 U.S.C. 154(b) by 0 days.

(21) Appl. No.: 10/013,253

(22) Filed: Dec. 10, 2001

(65) Prior Publication Data

US 2002/0088452 A1 Jul. 11, 2002

Related U.S. Application Data

(63) Continuation of application No. PCT/EP00/05131, filed on Jun. 5, 2000.

(30) Foreign Application Priority Data

Jun. 10, 1999 (DE) .......................................... 199 26 513

(51) Int. Cl.⁷ .............................. H05B 1/02; H05B 3/68
(52) U.S. Cl. .................................... 219/518; 219/447.1
(58) Field of Search ........................... 219/445.1, 446.1, 219/447.1, 460.1, 461.1, 465.1, 466.1, 509, 518

(56) References Cited

U.S. PATENT DOCUMENTS

| | | | |
|---|---|---|---|
| 4,476,946 A | | 10/1984 | Smith |
| 4,521,658 A | * | 6/1985 | Wyland et al. .............. 219/708 |
| 4,970,374 A | * | 11/1990 | Ueda et al. .................. 219/518 |
| 5,440,077 A | * | 8/1995 | Konishi et al. .............. 177/185 |

FOREIGN PATENT DOCUMENTS

| | | |
|---|---|---|
| DE | 94 10 156.6 U1 | 11/1994 |
| DE | 196 12 621 A1 | 10/1997 |
| EP | 0 464 925 A1 | 1/1992 |
| EP | 0 639 743 A2 | 2/1995 |

\* cited by examiner

*Primary Examiner*—Sang Paik
(74) *Attorney, Agent, or Firm*—Laurence A. Greenberg; Werner H. Stemer; Ralph E. Locher

(57) ABSTRACT

A cooktop includes a cooktop panel, at least one heating element for heating a cooking vessel placed upon the cooktop panel, and a weighing unit for detecting a deformation of the cooktop panel as a result of weight-induced loading by the cooking vessel and for determining the corresponding weight-induced loading. The weighing unit is disposed at the underside of the cooktop panel and has an actuating element connected to the cooktop panel and a displacement sensor connected to the actuating element and the cooktop panel. The displacement sensor determines the weight-induced loading from an amount that the actuating element is displaced relative to the displacement sensor as a result of the deformation of the cooktop panel.

14 Claims, 1 Drawing Sheet

COOKTOP WITH WEIGHING UNIT

CROSS-REFERENCE TO RELATED APPLICATION

This application is a continuation of International Application PCT/EP00/05131, filed Jun. 5, 2000, which designated the United States.

BACKGROUND OF THE INVENTION

Field of the Invention

The invention lies in the field of appliances. The invention relates to a cooktop having a cooktop panel, in particular, made of glass ceramic material, of which the underside has at least one heating element for heating a cooking vessel that can be set down on the cooktop panel. The cooktop has a detection unit that detects the deformation of the cooktop panel as a result of the weight-induced loading by the cooking vessel and determines the corresponding weight-induced loading.

Such a cooktop is disclosed in International PCT publication WO 95/35483. That cooktop has an uninterrupted surface panel with at least one heatable cooking point and a frame. The frame can be supported on a stationary or transportable support, for example, a conventional work top with cooktop cutout. The at least one sensor is disposed on the surface panel, between the surface panel and the frame or between the frame and the support. The at least one sensor is preferably a pressure or force sensor or a displacement sensor combined with a deformable bearing part, the sensor being disposed between the surface panel and the frame or between the frame and the support. Alternatively, it is also possible for the at least one sensor to be a deformation sensor and to be fitted on the surface panel itself, in particular, on the underside of the latter in the border region of the surface panel. The disadvantage of such a configuration of the deformation sensor is the low level of deformation of the cooktop panel by the dead weight of the set-down cooking vessel. The problem with the configuration of a pressure or force sensor in the region of the frame is that forces applied to the frame or the work top during the weighing operation, for example, by the user accidentally supporting himself/herself thereon, act as not inconsiderable and non-correctable disturbance variables. It is also problematic that the cooktop is to have a particularly high level of sealing against penetrating liquids precisely in the region between the cooktop panel and the frame and/or the work top.

U.S. Pat. No. 4,476,946 to Smith also discloses a cooktop. Therein, a circular cooking plate is movably secured in a corresponding opening of a cooktop panel. Fastened on the underside of the cooktop panel is a bending-bar configuration on which the circular cooking plate rests. The dead weight of the cooking plate results in a deflection of the bending bar. The deflection is detected by conventional strain gauges in a bridge-circuit configuration. The weight-induced loading of the cooking plate with a cooking vessel, for example, a pot, set down thereon is detected correspondingly. The disadvantage in the Smith device is the constant permanent loading of the bending bar and, in particular, the problematic sealing behavior in the encircling gap between the cooking plate and the cooktop panel with circular cutouts.

SUMMARY OF THE INVENTION

It is accordingly an object of the invention to provide a cooktop with weighing unit that overcomes the hereinafore-mentioned disadvantages of the heretofore-known devices of this general type and that, along with the straightforward construction, has sufficient accuracy for the weighing function.

With the foregoing and other objects in view, there is provided, in accordance with the invention, a cooktop including a cooktop panel, at least one heating element for heating a cooking vessel placed upon the cooktop panel, and a weighing unit for detecting a deformation of the cooktop panel as a result of weight-induced loading by the cooking vessel and for determining the corresponding weight-induced loading. The weighing unit is disposed at the underside of the cooktop panel and has an actuating element connected to the cooktop panel and a displacement sensor connected to the actuating element and the cooktop panel. The displacement sensor determines the weight-induced loading from an amount that the actuating element is displaced relative to the displacement sensor as a result of the deformation of the cooktop panel. This makes it possible to achieve a level of measuring accuracy that is sufficient for the measuring operation during cooking. The measured variable used according to the invention, rather than the deformation of the cooktop panel essentially in the plane of the cooktop panel or parallel to the cooktop panel, is, thus, the displacement as a result of the deformation of the cooktop panel in a direction perpendicular to the cooktop panel. Advantageously, it is possible for the cooktop panel to be of interruption-free configuration and, thus, to be sealed against penetrating liquid.

In accordance with another feature of the invention, it is advantageous, for example, for the displacement sensor to be secured on the underside of the cooktop panel and for the actuating element to be secured on a carrier part that, in turn, is itself secured on the underside of the panel of the cooktop. Alternatively, it is also possible for the fastening locations of the displacement sensor and of the actuating element to be the other way round. Both an additional part, in particular, adhesively bonded to the underside, and a specifically formed underside of the cooktop panel are possibilities for an embodiment of the actuating element. Because the two components detecting the deformation and the resulting displacement of the cooktop panel are each fastened on the underside of the cooktop panel, disruptive influences by weight-induced loading of the work top, in which the cooktop is installed, or of the cooktop frame are ruled out.

In accordance with a further feature of the invention, to take account of the different coefficients of linear expansion between the carrier part and the cooktop panel, the carrier part is secured on the cooktop panel at least at two fastening locations, the carrier part being mounted such that it can be moved horizontally at least at one fastening location. Such mounting of the carrier part, which is free on one side parallel to the cooktop panel, rules out mechanical stressing during heating of the cooktop with its components, which stressing could be produced on account of the different thermally induced linear expansions of the cooktop panel and of the carrier part.

In accordance with an added feature of the invention, to provide the highest level of measuring sensitivity, the fastening locations of the carrier part are disposed in the border region of the cooktop panel. Such a configuration is due to the fact that these are the regions where bending of the cooktop panel is at the lowest level.

In accordance with an additional feature of the invention, there is provided a spring element applying a bias forcing the carrier part against the underside of the panel. The carrier part is forced onto the underside of the cooktop panel by at least one spring element to ensure precisely defined spacing of the carrier part relative to the cooktop panel and, thus, of the actuating element relative to the displacement sensor. In addition, in the region, the operating temperature is rather lower, which makes it easier to fasten the weighing components on the underside of the cooktop panel.

In order that the weighing configuration and the components thereof are not adversely affected in the event of overload, in accordance with yet another feature of the invention, the carrier part is mounted at one of the fastening locations such that it can be pivoted away perpendicularly from the cooktop panel.

In accordance with yet a further feature of the invention, a weighing marking is provided on the top side of the cooktop panel approximately in the center of gravity of the surface area of the cooktop panel. Such placement ensures that a user sets down the cooking vessel at the location that results in maximum deformation or bending of the cooktop panel. Alternatively, it is also possible, instead of the weighing marking, for the cooktop panel to have a raised portion in the region and to have a set-down surface projecting slightly out of the surface of the cooktop panel. If requirements for accuracy are not as stringent, however, it may also be possible for the cooking vessel to be set down on one of the conventional heating zones during the weighing operation. The extent of the bending of the cooktop panel as a result of the weight-induced loading may additionally be set by a specific reduction in the thickness of the cooktop panel at selected locations.

In order to achieve high accuracy, in accordance with yet an added feature of the invention, the displacement sensor and the actuating element are disposed approximately in the center of gravity of the surface area of the cooktop panel, in particular in the case of a weighing marking provided there.

In accordance with yet an additional feature of the invention, a reliable and precise measurement can be realized if the displacement sensor has at least one bending bar on which conventional strain gauges are disposed. To secure the bending-bar configuration in the event of overload, in accordance with again another feature of the invention, the configuration has a stop element for limiting the bending movement. The protective measure is particularly beneficial, in particular, when the carrier part is additionally mounted at one of the fastening locations such that it can be pivoted away perpendicularly from the cooktop panel.

In accordance with a concomitant feature of the invention, the cooktop panel is a glass ceramic material.

Other features that are considered as characteristic for the invention are set forth in the appended claims.

Although the invention is illustrated and described herein as embodied in a cooktop with weighing unit, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
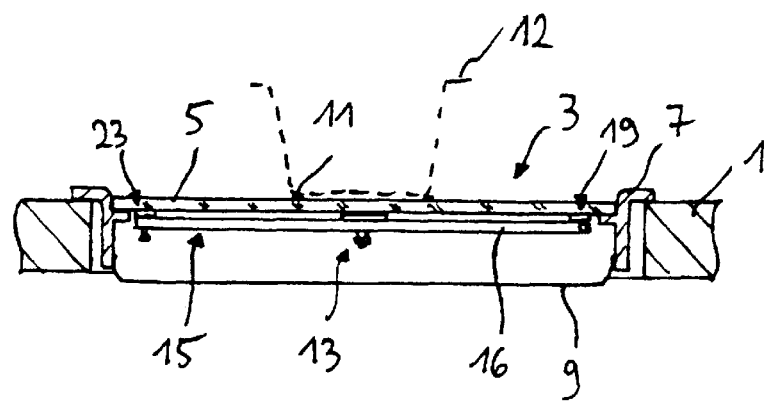
FIG. 1 is a fragmentary, cross-sectional view of a cooktop installed in a work-top cutout and having a weighing configuration according to the invention.

Referring now to the figures of the drawings in detail and first, particularly to FIG. 1 thereof, there is shown a cooktop 3 installed in a cutout of a work top 1 or counter top. A rectangular cooktop panel 5, for example, made of glass ceramic material, is enclosed around the periphery by a cooktop frame 7. The frame 7 is supported around the periphery, in the border region of the work-top cutout, on the top side of the work top 1. Suitable conventional non-illustrated sealings are provided between the work top 1 and the cooktop frame 7, on one hand, and the cooktop panel 5 and the cooktop frame 7, on the other hand. Furthermore, the cooktop frame 7 has an extension that projects from the periphery and on which the cooktop panel 5 rests. On the base side, the cooktop 3 is closed by a base tray 9 connected to the cooktop frame 7. The cooktop 3 also has conventional heating elements, and the components thereof, to make possible for cooking vessels, which can be set down on the corresponding hot plates on the cooktop 3, to be heated in a regulated manner, corresponding to the set and/or predeterminable power stages, by a non-illustrated control unit.

Figure 2:
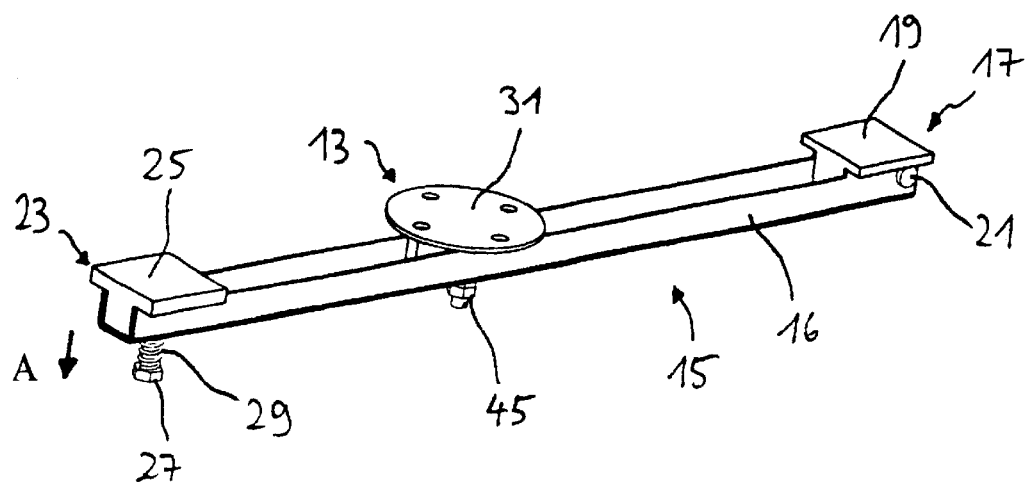
FIG. 2 is an enlarged perspective view from above of the weighing configuration of FIG. 1.
Figure 3:
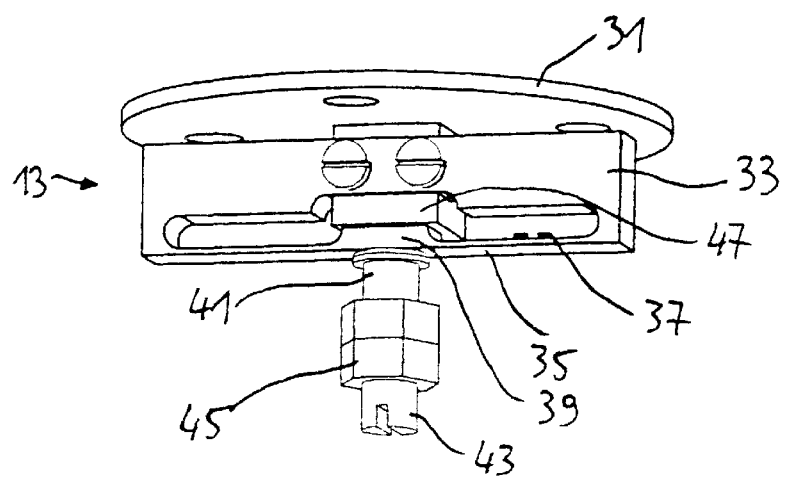
FIG. 3 is a further-enlarged, perspective view of a displacement sensor and an actuating element of the weighing configuration of FIG. 2.

An annular weighing decoration 11 is provided on the top side of the cooktop panel 5, in the region of the center of gravity of the surface area thereof. During the weighing operation, the user precisely positions a pot 12 on the decoration 11. Depending on the weight of the pot 12 and of the contents thereof, the peripherally supported cooktop panel 5 bends. The bending here in the center of gravity of the surface area of the glass ceramic cooktop panel 5 is approximately 0.2 mm in the case of a loading of 7 kg induced by the weight of the pot. A displacement sensor 13 is fastened (FIGS. 1, 2, and 3) on the underside of the cooktop panel 5, in the center of gravity of the surface area, and partially penetrates (see FIGS. 1 and 2) into a carrier part 15, which is likewise fastened on the underside of the cooktop panel 5, or into the elongate U-profile part 16 of the carrier part 15. The carrier part 15 is adhesively bonded to the underside of the cooktop panel 5, in the respective border region of the cooktop panel 5 by an articulation block 17 and of a fastening block 23. For such a purpose, the articulation block 17, as a T-shaped profile part, is provided with a large fastening or adhesive-bonding surface 19. The U-profile part 16 of the carrier part 15 is rotatably secured on the articulation block 17 by a bearing bolt 21 (FIG. 2). In addition, a non-illustrated compression spring is supported on the articulation block 17 in the region of the bearing bolt 21 to force the U-profile part 16 into a defined starting position relative to the underside of the cooktop panel 5. The spring compensates for the play of the bearing bolt 21 in the corresponding two openings of the U-profile part 16. At the opposite end section of the carrier part 15, the fastening block 23, which is of similar configuration to the articulation block 17, is secured in the U-profile part 16. The likewise T-shaped fastening block 23 also has, on its top side, a large fastening or adhesive bonding surface 25 for large-surface-area fastening on the underside of the cooktop panel 5. Screwed into the underside of the fastening block 23 is a fastening screw 27 that is guided in a slot in the base of the U-profile part 16 such that it can be displaced, together with the fastening block 23 in the profile part 16, along the longitudinal axis of the profile part 16. An overload spring 29 is disposed between the underside of the base of the U-profile part 16 and the screw head (FIG. 2). The overload spring 29 forces the carrier part 15, in the region of the fastening block 23, in a defined manner against the underside of the fastening block 23. In the case of different linear expansions of the carrier part 15 and the cooktop panel 5 during heating of the cooktop 3, the carrier part 15 can expand without obstruction in the region of the fastening block 23, while the articulation block 17 and the fastening block 23 remain fixed to the underside of the cooktop panel 5. To reduce friction losses, it is possible to use friction-reducing shims in the region of the fastening block 23 (FIG. 2).

The displacement sensor 13 is fastened on the underside of the cooktop panel 5, in the region of the weighing decoration 11 (FIG. 1), through a displacement-sensor fastening surface or adhesively-bonded surface 31 of a circular fastening plate. A bending-bar part 33 is formed integrally on the underside of the fastening plate or is connected thereto. Formed by a suitable cutout in the core region of the bending-bar part 33, in the bottom end section of the bending-bar part 33, is a bending bar 35 that extends essentially over the entire length thereof. Four strain gauges 37 are adhesively bonded in a region of the bending bar 35 and are connected to a non-illustrated conventional electronic processing circuit intended for evaluating the signals. Acting in the reinforced central region 39 of the bending bar 35 is a push-rod-like actuating element 41 that is screwed to the U-profile part 16 of the carrier part 15. The actuating element 41 has an adjusting-screw section 43, which is provided with an adjusting nut 45. With aid of the adjusting screw 43 and/or of the adjusting nut 45, the actuating element 41, in the absence of weight-induced loading of the cooktop panel 5 by a pot 12, is set for precise abutment against the underside of the central region 39 of the bending bar 35. In the case of weight-induced loading by a pot 12 positioned on the cooktop panel 5, the cooktop panel 5 then bends. As a result, the bending-bar part 35, and, in particular, the central region 39, correspondingly moves downward to a slight extent. As such, the actuating element 41, which is fastened on the rigid carrier part 15, presses onto the central region 39 from beneath and bends the bending bar 35. The overload spring 29 is correspondingly constructed to be stiff enough for the displacement of the cooktop panel 5 to be transmitted fully to the bending bar 35. The relative change in displacement between the actuating element 41 and the central region 39 is evaluated in a conventional manner by a non-illustrated control unit and a corresponding weight-induced loading is determined. In the event of overload, for example, if a user supports himself/herself on the cooktop panel 5, the bending-bar part 33 is moved downward, as a result of the deformation of the cooktop panel 5, until the top side of the central region 39 of the bending bar 35 strikes against the underside of a stop element 47 of the bending-bar part 33. The distance, without loading by a pot, may be set, for example, to approximately 0.2 mm. The rest of the deformation displacement of the cooktop panel on account of the weight-induced loading is absorbed by the pivotably mounted U-profile part 16. Thus, the bending-bar part 33 forces the carrier part 15, counter to the force of the overload spring 29, in the downward direction according to the arrow A in FIG. 2.

I claim:

1. A cooktop, comprising:
   a cooktop panel having an underside;
   at least one heating element for heating a cooking vessel placed upon said cooktop panel, said at least one heating element disposed at said underside; and
   a weighing unit for detecting a deformation of said cooktop panel-as a result of weight-induced loading by the cooking vessel and for determining the corresponding weight-induced loading, said weighing unit disposed at said underside and having:
      an actuating element connected to said cooktop panel;
      a displacement sensor connected to said actuating element and said cooktop panel, said displacement sensor determining the weight-induced loading from an amount said actuating element is displaced relative to said displacement sensor as a result of the deformation of said cooktop panel.

2. The cooktop according to claim 1, wherein:
   a carrier part is secured on said underside; and
   one of the group consisting of said displacement sensor and said actuating element is secured on said underside and the other one of the group consisting of said displacement sensor and said actuating element is secured on said carrier part.

3. The cooktop according to claim 2, wherein:
   said carrier part is secured on said underside on at least two fastening locations; and
   said carrier part is mounted at one of said at least two fastening locations moveable in a direction parallel to said cooktop panel.

4. The cooktop according to claim 3, wherein:
   said cooktop panel has a border region; and
   said at least two fastening locations are disposed in said border region.

5. The cooktop according to claim 2, including a spring element applying a bias forcing said carrier part against said underside.

6. The cooktop according to claim 3, wherein said carrier part is pivotably mounted at one of said at least two fastening locations to pivot away perpendicularly from said cooktop panel.

7. The cooktop according to claim 1, wherein:
   said cooktop panel has a topside and a surface area with a center of gravity; and
   a weighing marking is disposed on said topside approximately at said center of gravity.

8. The cooktop according to claim 1, wherein:
   said cooktop panel has a surface area with a center of gravity; and
   said displacement sensor and said actuating element are disposed approximately at said center of gravity.

9. The cooktop according to claim 7, wherein said displacement sensor and said actuating element are disposed approximately at said center of gravity.

10. The cooktop according to claim 1, wherein said displacement sensor has at least one bending bar and strain gauges disposed on said at least one bending bar.

11. The cooktop according to claim 10, including a stop element for limiting a bending movement of said bending bar.

12. The cooktop according to claim 1, wherein said cooktop panel is a glass ceramic material.

13. In a cooktop having a cooktop panel with an underside and at least one heating element for heating a cooking vessel placed upon the cooktop panel, a weighing device comprising:
   a weighing unit for detecting a deformation of the cooktop panel as a result of weight-induced loading by the cooking vessel and for determining the corresponding weight-induced loading, said weighing unit disposed at the underside of the cooktop panel and having:

an actuating element connected to the cooktop panel;

a displacement sensor connected to said actuating element and the cooktop panel, said displacement sensor determining the weight-induced loading from an amount said actuating element is displaced relative to said displacement sensor as a result of the deformation of the cooktop panel.

14. In a cooktop having a cooktop panel with an underside and at least one heating element for heating a cooking vessel placed upon the cooktop panel, a weighing device comprising:

means for detecting a deformation of the cooktop panel as a result of weight-induced loading by the cooking vessel and for determining the corresponding weight-induced loading, said detecting and determining means disposed at the underside of the cooktop panel and having:

an actuating element connected to the cooktop panel;

a displacement sensor connected to said actuating element and the cooktop panel, said displacement sensor determining the weight-induced loading from an amount said actuating element is displaced relative to said displacement sensor as a result of the deformation of the cooktop panel.

* * * * *